United States Patent
Bishop et al.

(10) Patent No.: US 9,577,830 B2
(45) Date of Patent: Feb. 21, 2017

(54) MULTI-TENANT DISCOVERY AND CLAIMING OF DISTRIBUTED STORAGE NODES OVER AN INSECURE NETWORK

(71) Applicant: SwiftStack, Inc., San Francisco, CA (US)

(72) Inventors: Darrell Bishop, San Francisco, CA (US); Samuel Merritt, Hayward, CA (US); Joseph Arnold, San Francisco, CA (US)

(73) Assignee: SwiftStack, Inc., San Francisco, CA (US)

( * ) Notice: Subject to any disclaimer, the term of this patent is extended or adjusted under 35 U.S.C. 154(b) by 41 days.

(21) Appl. No.: 14/710,517

(22) Filed: May 12, 2015

(65) Prior Publication Data

US 2015/0334110 A1    Nov. 19, 2015

Related U.S. Application Data

(60) Provisional application No. 61/994,779, filed on May 16, 2014.

(51) Int. Cl.
*H04L 29/06* (2006.01)
*H04L 9/32* (2006.01)
*H04L 29/08* (2006.01)

(52) U.S. Cl.
CPC .......... *H04L 9/3215* (2013.01); *H04L 9/3268* (2013.01); *H04L 29/06* (2013.01); *H04L 29/08* (2013.01); *H04L 63/0272* (2013.01); *H04L 63/06* (2013.01); *H04L 63/0823* (2013.01); *H04L 67/02* (2013.01); *H04L 67/1031* (2013.01); *H04L 67/16* (2013.01); *H04L 67/28* (2013.01); *H04L 67/42* (2013.01)

(58) Field of Classification Search
CPC .. H04L 63/0823; H04L 63/0807; H04L 9/326; H04L 67/02; G06F 21/10
USPC .......................................................... 713/156
See application file for complete search history.

(56) References Cited

U.S. PATENT DOCUMENTS

| | | | | |
|---|---|---|---|---|
| 5,835,712 A * | 11/1998 | DuFresne | ........... | G06F 21/6227 707/999.01 |
| 2006/0236092 A1* | 10/2006 | Hamalainen | ............ | H04L 63/12 713/151 |
| 2014/0365372 A1* | 12/2014 | Ross | ................... | H04L 63/0471 705/44 |

OTHER PUBLICATIONS

Sefraoui, Omar, Mohammed Aissaoui, and Mohsine Eleuldj. "OpenStack: toward an open-source solution for cloud computing." International Journal of Computer Applications 55.3 (2012).*

(Continued)

*Primary Examiner* — Syed Zaidi
(74) *Attorney, Agent, or Firm* — Perkins Coie LLP (57) ABSTRACT

A technique is introduced that enables a server to establish trust of and a secure channel of communication with an unverified client computer, which can be on a different insecure network. To establish trust, the server needs to ensure that the client computer is legitimate, and the client computer similarly needs to ensure that the server is legitimate. With mutual trust established, a secure channel of communication is established between the server and the client computer. With mutual trust and a secure channel of communication established, the client computer can safely communicate with the server, for example, to download software that enables the client computer to join a central management system at the server.

21 Claims, 4 Drawing Sheets

(56) References Cited

OTHER PUBLICATIONS

Hernandez, F., et al. "Mucura: your personal file repository in the cloud." Journal of Physics: Conference Series. vol. 396. No. 3. IOP Publishing, 2012.*

* cited by examiner

MULTI-TENANT DISCOVERY AND CLAIMING OF DISTRIBUTED STORAGE NODES OVER AN INSECURE NETWORK

CROSS-REFERENCE TO RELATED APPLICATIONS

This application claims the benefit of U.S. Provisional Patent Application No. 61/994,779, filed on May 16, 2014, entitled "MULTI-TENANT DISCOVERY AND CLAIMING OF DISTRIBUTED STORAGE NODES OVER AN INSECURE NETWORK", which is incorporated herein by reference in its entirety.

FIELD

At least one embodiment of the present disclosure pertains to a multi-tenant, highly scalable, and durable object storage system, and more particularly, to multi-tenant discovery and claiming of distributed storage nodes over an insecure network.

BACKGROUND

The pervasiveness of the Internet and the advancements in network speed have enabled a wide variety of different applications on storage devices. For example, cloud storage, or more specifically, network distributed data storage system, has become a popular approach for safekeeping data as well as making large amounts of data accessible to a variety of clients. As the use of cloud storage has grown, cloud service providers aim to address problems that are prominent in conventional file storage systems and methods, such as scalability, global accessibility, rapid deployment, user account management, and utilization data collection. In addition, the system's robustness must not be compromised while providing these functionalities.

Among different distributed data storage systems, an object storage system employs a storage architecture that manages data as objects, as opposed to other storage architectures like file systems which manage data as a file hierarchy, and block storage which manages data as blocks within sectors and tracks. Generally, object storage systems allow relatively inexpensive, scalable and self-healing retention of massive amounts of unstructured data. Object storage is used for diverse purposes such as storing photos and songs on the Internet, or files in online collaboration services.

As new users are added to a storage system, storage space needs to be securely allocated to the new users. Complicating matters are that, with cloud storage as well as some other types of network distributed data storage, portions of a storage system may be accessible via insecure networks. To obtain needed disk space, users need to discover and claim distributed storage nodes, and need to be able to securely do so over an insecure network.

SUMMARY

Introduced here is a technique for a first computer, such as a server, to establish trust and a secure channel of communication with an untrusted/unverified second computer, such as a client computer, that is on a different network that may be insecure. A multi-tenant central management system is a system which can manage resources, such as computing resources, storage resources, etc. To join or register with a central management system, a client computer may want to download and install client software that enables the client computer to be added to the central management system.

Before the client computer joins/registers with the central management system, the management system needs to ensure that the client computer has a legitimate request to join/register with the system. The client computer has a similar need to ensure that the central management system is legitimate before downloading any software or other data from the management system. Further, a mutual verification of legitimacy may need to work in an environment where the network is insecure. With mutual trust established, a secure channel of communication needs to be established between the server and the client computer.

Without such mutual verification and secure communication, security issues may arise, such as from a "man in the middle" attack. With mutual trust and a secure channel of communication established, the client computer can safely download software that enables the client to join/register with the central management system.

BRIEF DESCRIPTION OF THE DRAWINGS

One or more embodiments of the present disclosure are illustrated, by way of example and not limitation, in the figures of the accompanying drawings, in which like references indicate similar elements.

DESCRIPTION

A storage system can be a file-based storage system, an object-based storage system, etc. Some storage systems, such as the OpenStack Object Storage system, referred to herein as "Swift," are multi-tenant, highly scalable, and durable storage systems designed to store large amounts of unstructured data at low cost. A highly scalable storage system, such as Swift, can scale from a few nodes and a handful of hard drives to thousands of clustered machines with multiple petabytes of storage, and can be designed to be horizontally scalable so there is no single point-of-failure.

Some highly scalable storage systems can be used by businesses of various sizes, service providers, and research organizations worldwide. These storage systems can be used to efficiently store unstructured data, such as documents, Web and media content, backups, images, virtual machine snapshots, etc.

Figure 1:
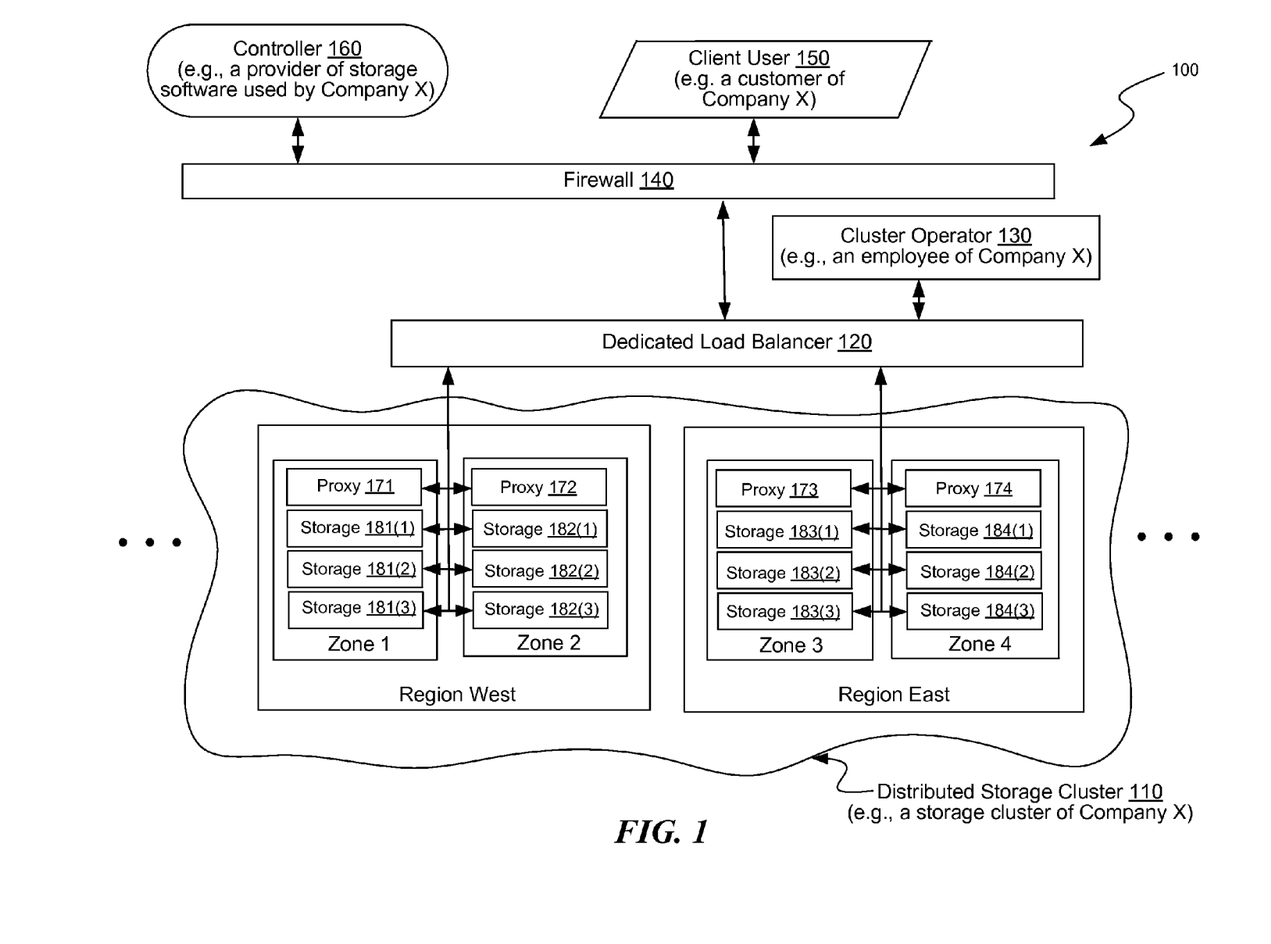
FIG. 1 is a block diagram that illustrates a network storage system, consistent with various embodiments.

FIG. 1 illustrates network storage system 100 in which some embodiments of the techniques introduced here may be utilized. Network storage system 100 includes, for example, distributed storage cluster 110, dedicated load balancer 120, cluster operator 130, firewall 140, client user 150, and controller 160. One or more elements in network storage environment 100 are communicatively coupled to each other through a computer communications network, which can be or include the Internet and one or more wired or wireless networks (e.g., an IP-based LAN, MAN or WAN, a Wireless LAN (WLAN) network, and/or a cellular telecommunications network).

Network storage system 100, in the example of FIG. 1 used by Company X, can be an object storage system (e.g., OpenStack Object Storage system, also known as "Swift"), which is a multitenant, highly scalable, and durable object storage system designed to store large amounts of unstructured data at low cost. Network storage system 100 is highly scalable because it can be deployed in configurations ranging from a few nodes and a handful of drives to thousands of machines with tens of petabytes of storage. Network storage system 100 is designed to be horizontally scalable so there is no single point of failure. Storage clusters can scale horizontally simply by adding new servers. If a server or hard drive fails, network storage system 100 automatically replicates its content from other active nodes to new locations in the cluster. Therefore, network storage system 100 can be used by businesses of variable sizes, service providers, and research organizations worldwide. Network storage system 100 can be used to store unstructured data such as documents, web and media content, backups, images, virtual machine snapshots, etc. Objects and files can be written to multiple disk drives spread throughout servers in the data center, with system software being responsible for ensuring data replication and integrity across the cluster.

Some characteristics of the network storage system 100 differentiate it from some other storage systems. For instance, in some embodiments, network storage system 100 is not a traditional file system or a raw block device; instead, network storage system 100 enables users to store, retrieve, and delete objects (with metadata associated with the objects) in logical containers (e.g., via a RESTful HTTP API). Developers can, for example, either write directly to an application programming interface (API) of network storage system 100, can use one of the many client libraries that exist for many popular programming languages (such as Java, Python, Ruby, C#, etc.), among others. Other features of network storage system 100 include being natively designed to store and serve content to many concurrent users, being able to manage storage servers with no additional vendor specific hardware needed, etc. Also, because, in some embodiments, network storage system 100 uses software logic to ensure data replication and distribution across different devices, inexpensive commodity hard drives and servers can be used.

Referring back to FIG. 1, distributed storage cluster 110 is a distributed storage system used for object storage. Distributed storage cluster 110 is a collection of machines that run server processes and consistency services (e.g., in the form of "daemons"). A "daemon" is a computer program that can run as a background process or service, in contrast to being under the direct control of an interactive user. Each machine that runs one or more processes and/or services is called a node. When there are multiple nodes running that provide all the processes needed to act as a distributed storage system, such as network storage system 100, the multiple nodes are considered to be a cluster (e.g., distributed storage cluster 110). In some embodiments, there are four server processes: proxy, account, container and object. When a node has only the proxy server process running it is called a proxy node, such as proxy nodes 171-174. A node running one or more of the other server processes (account, container, or object) is called a storage node, such as storage nodes 181-184. Storage nodes contain data that incoming requests wish to affect (e.g. a PUT request for an object would go to the appropriate nodes running the object server processes). Storage nodes can also have a number of other services running on them to maintain data consistency.

As illustrated in FIG. 1, within a cluster the nodes can belong to multiple logical groups: e.g., regions (such as Region West and Region East, FIG. 1) and zones (such as Zone 1 with proxy server 171 and storage nodes 181(1)-181(3)). Regions and zones are user-defined and identify unique characteristics about a collection of nodes, for example geographic location and points of failure, such as all the power running to one rack of nodes. Having such groups, zones, etc., facilitate network storage system 100 placing data across different parts of the cluster to reduce risk.

More specifically, the proxy servers 171-174 can function as an interface of network storage system 100, as proxy servers 171-174 can communicate with external clients. As a result, proxy servers 171-174 can be the first and last to handle an API request from, for example, an external client, such as client user 150, which can be a computer of a customer of Company X. Client user 150 can be one of multiple external client users of network storage system 100. In some embodiments, all requests to and responses from proxy servers 171-174 use standard HTTP verbs and response codes. Proxy servers 171-174 can use a shared-nothing architecture, among others. A shared-nothing architecture is a distributed computing architecture in which each node is independent and self-sufficient and there is no single point of contention in the system. For example, none of the nodes in a shared-nothing architecture share memory or disk storage. Proxy servers 171-174 can be scaled as needed based on projected workloads. In some embodiments, a minimum of two proxy servers are deployed for redundancy—should one proxy server fail, a second proxy server can take over.

The storage nodes 181-184 are responsible for storage of objects on the drives of its node. In some embodiments, objects are stored as binary files on the drive using a path that is made up in part of its associated partition and the timestamp of an operation associated with the object, such as the timestamp of the upload/write/put operation that created the object. A path can be, e.g., the general form of the name of a file/directory/object/etc. The timestamp may allow, for example, the object server to store multiple versions of an object while providing the latest version for a download/get request. In other embodiments, the timestamp may not be necessary to provide the latest copy of object during a download/get. In these embodiments, the system can return the first object returned regardless of timestamp. The object's metadata (standard and/or custom) can be stored in the file's extended attributes (xattrs), and the object's data and metadata can be stored together and copied as a single unit.

Although not illustrated in FIG. 1 for simplicity, a node that runs an account server process can handle requests regarding metadata for individual accounts, or for the list of the containers within each account. This information can be stored by the account server process in SQLite databases on disk, for example. Also, a node that runs a container server process can handle requests regarding container metadata or the list of objects within each container. Note that, in some embodiments, the list of objects does not contain information about the location of the object, and rather may simply contain information that an object belongs to a specific container. Like accounts, the container information can be stored as SQLite databases. In some embodiments, depending on the deployment, some nodes may run some or all services. Although illustrated as separated in FIG. 1, in some embodiments storage nodes and proxy server nodes may overlap.

In some embodiments, network storage system 100 optionally utilizes a load balancer 120. In general, load balancer 120 is used to distribute workload evenly among the proxy servers. In some embodiments, load balancer 120 is capable of prioritizing TCP and UDP traffic. Further, load balancer 120 can distribute requests for HTTP sessions among a number of resources in distributed storage cluster 110. Load balancer 120 can be provided as one of the services run by a node, can be provided externally (such as via a round-robin DNS, a commercial load balancer, etc.), etc.

Illustrated in FIG. 1 are two regions in distributed storage cluster 110, Region West and Region East. Regions are user-defined and can indicate that parts of a cluster are physically separate. For example, regions can indicate that part of a cluster are in different geographic regions. In some embodiments, a cluster can have one region. Distributed storage cluster 110 uses two or more regions and is, resultantly, a multi-region cluster. When a read request is made, a proxy server may favor nearby copies of data as measured by latency. When a write request is made, the proxy layer can write to all the locations simultaneously. In some embodiments, an option called write affinity, when activated, enables the cluster to write all copies locally and then transfer the copies asynchronously to other regions.

In some embodiments, within regions, network storage system 100 allows availability zones to be configured to, for example, isolate failure boundaries. An availability zone can be a distinct set of physical hardware whose failure would be isolated from other zones. In a large deployment example, an availability zone may be configured as a unique facility in a large data center campus. In a single datacenter deployment example, each availability zone may be a different rack. In some embodiments, a cluster has many zones. A globally replicated cluster can be created by deploying storage nodes in geographically different regions (e.g., Asia, Europe, Latin America, America, Australia, or Africa). The proxy nodes can be configured to have an affinity to a region and to optimistically write to storage nodes based on the storage nodes' region. In some embodiments, the client can have the option to perform a write or read that goes across regions (i.e., ignoring local affinity).

With the above elements of the network storage system 100 in mind, an application example of network storage system 100 is introduced as follows. In this example, network storage system 100 is a storage system of Company X and client user 150 is a computer of a customer of Company X. When a valid request is sent from client user 150, through firewall 140, to distributed storage cluster 110, load balancer 120 determines which proxy node in distributed storage cluster 110 to which to route the request. The selected proxy node (e.g. proxy 171-174) verifies the request and determines, among the storage nodes 181-184, on which storage node(s) the requested object is stored (based on a hash of the object name) and sends the request to the storage node(s). If one or more of the primary storage nodes is unavailable, the proxy will choose an appropriate hand-off node to which to send the request. The node(s) return a response and the proxy in turn returns the first received response (and data if it was requested) to the requester. A proxy server process can look up multiple locations because a storage system, such as network storage system 100, can provide data durability by writing multiple (in some embodiments, a target of 3) complete copies of the data and storing them in distributed storage cluster 110.

As previously mentioned, proxy services handle external communication with clients and storage services handle storage and maintenance of data stored at network storage system 100. In some embodiments, accounts are root storage locations for data in a storage cluster (e.g., network storage cluster 100). Containers are user-defined segments of the account that provide the storage location where objects are found. Accounts enable multiple users and applications to access the storage system at the same time. Accounts and containers store key information about themselves in separate databases that are distributed throughout the system. Accounts allow users who access them to create and store data in individual containers. Although containers cannot be nested, they are conceptually similar to directories or folders in a file system.

Controller 160 is the management system which provides cluster operator 130 an interface (e.g., browser-based) to facilitate management of nodes, configuration of networking, and management of user accounts for Company X's cluster. Cluster operator 130 can be one of multiple cluster operators to which controller 160 provides such an interface. In the example of FIG. 1, controller 160 executes at a server of a provider of storage software used by Company X. Cluster operator 130 can also use controller 160 for monitoring, authentication, integrations, alerts, system statistics, reports, etc. These statistics and reports can be based on accurately aggregated data and can enable cluster operator 130 to determine storage utilization for chargeback, billing, and other purposes. Such capabilities can be useful for entities, such as Company X, who would like to leverage the multi-tenancy of controller 160 to enable their own customers to manage their storage clusters through controller 160.

In some embodiments, controller 160 can be accessed online. In some embodiments, controller 160 is installed and runs on a server on the protected side of firewall 140 (i.e., on the same side of firewall 140 as distributed storage cluster 110), rather than on the Internet wide of firewall 140 (e.g., the side of firewall 140 on which client user 150 is shown in the example of FIG. 1). In some of these embodiments, controller 160, which provides the management function of distributed storage cluster 110, is independent of the proxy and data storage functions that the nodes of distributed storage cluster 110 are performing.

A multi-tenant central management system (e.g., controller 160) that manages and monitors an eventually consistent distributed storage system (e.g., network storage system 100) faces unique challenges when collecting and aggregating data metrics. Operators of any storage system need to know how much data a user is storing in order to charge the user accordingly. Similarly, operators of network-based storage systems often need to know how much data was transferred in or out of the system. Metrics that can satisfy these needs may be based on data which could include, for example, an account identification (ID), along with the following data per account: the number of bytes used per storage category, the number of bytes transferred into the cluster, and the number of bytes transferred out of the cluster. An eventually consistent distributed storage system that uses replicas for durability has several factors (e.g., robustness, scalability, and accuracy) that can increase the difficulty of generating an accurate accounting and reporting of these metrics.

Accordingly, in some embodiments, controller 160 employs one or more mechanisms for collecting storage and transfer utilization metrics for an account in network storage system 100 that are more scalable and robust than conventional ways. As previously discussed, controller 160, along with other elements in network storage system 100, accomplish this, in part, by having a portion of the processing take place on the storage nodes themselves, which scale horizontally. On each of the proxy servers and storage nodes, utilization data for that node is first collected, essentially performing a first pass of aggregation. After the first pass of aggregation, post-aggregated data is sent to a central controller where the data is further aggregated and collated. Also, in the case of some metrics, for example transfer utilization metrics, there can be an additional level of aggregation derived from the proxy access logs (e.g., for improved accuracy). In addition, the techniques can include several mechanisms to ensure robustness of the metrics collection mechanisms.

For example, in some embodiments of distributed storage cluster 110, storage metrics (e.g., container count, object count, and total bytes used) are stored in account databases (e.g., Swift Account DBs) that are distributed throughout network storage system 100. Raw transfer data are stored in log files on the proxy nodes. Overall, the collection mechanism collects, aggregates and stores (1) utilization data (container count, object count, and total bytes stored) from account databases and (2) transfer metrics (bytes in, bytes out, and request count) from all nodes across a distributed storage system. Based on methods of data collection, aggregation and correction, this collection mechanism produces metrics for storage utilization and transfer activity, which can be used for reporting, billing and/or chargeback purposes. Both storage utilization and transfer metrics are collected, and in some cases, for example with transfer metrics there may also be some amount of preliminary computation, at their respective nodes before they are sent to controller 160 for aggregation, storage, and presentation. The metrics can be sent via, for example, a RESTful API. The raw proxy logs and the collected storage data can also be stored in distributed storage cluster 110 itself to support resolution of any billing disputes.

Figure 2:
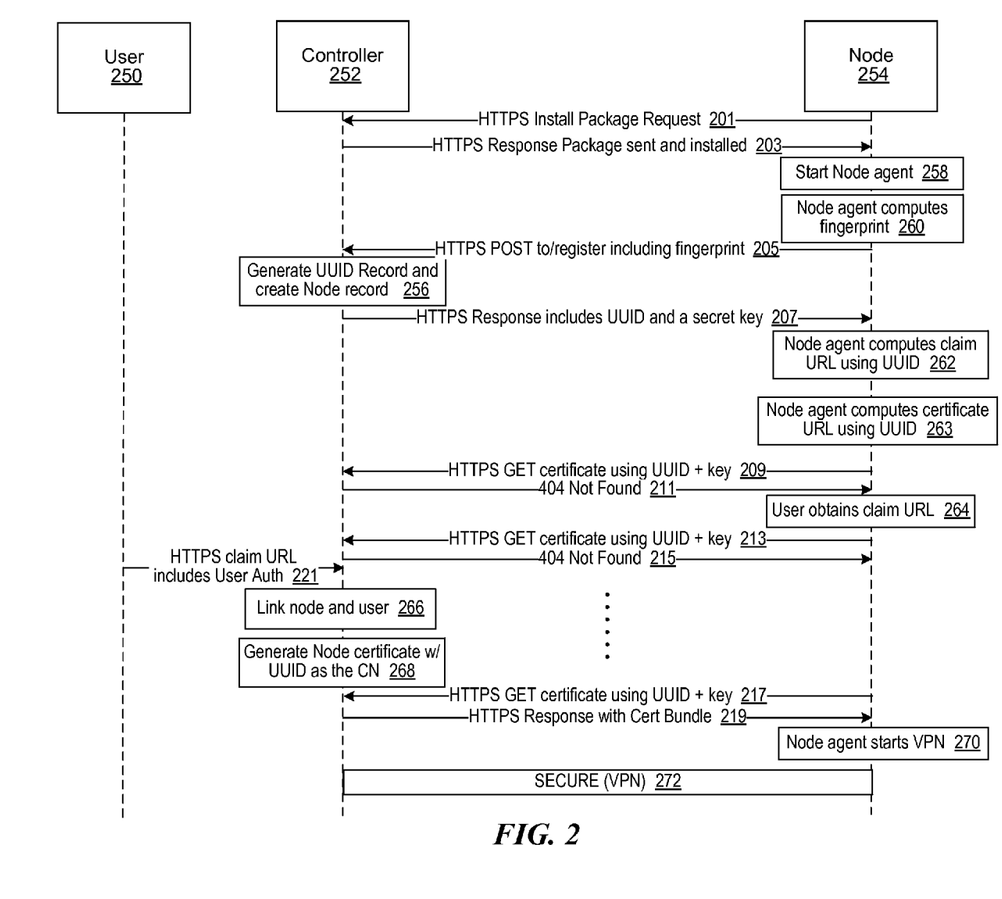
FIG. 2 is a sequence diagram that illustrates a method for multi-tenant discovery and claiming of distributed storage nodes over an insecure network, consistent with various embodiments.

FIG. 2 is a sequence diagram for a system for multi-tenant discovery and claiming of distributed storage nodes over an insecure network according to the invention. In the example of FIG. 2, user 250 can be client user 150 or cluster operator 130 of FIG. 1 (among other users associated with either the client of client user 150 or with Company X), controller 252 can be controller 160 of FIG. 1, and node 254 can be a node of distributed storage cluster 110, such as proxy 171-174 (e.g., proxy 171, proxy 172, etc.), storage 181-184 (e.g., storage 181(1), storage 184(2), etc.), among others.

In the example of FIG. 1, which will be leveraged in the following description of FIG. 2, Company X utilizes a storage system, such as network storage system 100. In some embodiments, Company X can download and install storage software from a storage software provider, such as the company that operates controller 252. Company X can use the storage software as part of a storage system.

One of the issues facing a multi-tenant central management system, such as controller 252, operating over an insecure network is establishing trust and a secure channel of communication between the central management system and an unverified and untrusted server, such as node 254. Node 254 can be on a different network than controller 252. For example, node 254 can be on the protected side of a firewall (such as on the same side of firewall 140 as is distributed storage cluster 110 of FIG. 1), and controller 252 can be on the Internet side of the firewall (such as on the same side of firewall 140 as is controller 160 of FIG. 1).

Security issues exist for both controller 252 and node 254. For example, to ensure security, node 254 needs to ensure that it is communicating with and downloading software from an authentic server of the storage software company, and controller 252 of the storage software company needs to ensure that it is communicating with and sending software to an authentic computer of Company X. Company X is the client of the storage software company in the example of FIG. 1, which is being leveraged in the example of FIG. 2.

A cluster operator, such as a cluster operator that uses node 254, can obtain a secure hypertext transfer protocol (HTTPS) address from a storage software provider, such as the storage software provider that operates controller 252. For example, the cluster operator can receive the HTTPS address via a phone call from an employee of the storage software provider, via an email or a secure email from an employee of the storage software provider, etc. Because the HTTPS address is from a trusted source (e.g., the storage software provider), and because HTTPS is a secure protocol that enables node 254 to communicate securely with controller 252, the cluster operator and node 254 can trust that they are securely communicating with an authentic server of the storage software provider.

Based on trusting the HTTPS address, the cluster operator runs a local command on node 254, which sends an HTTPS install package request to controller 252 (message 201). Controller 252 can be executed at, for example, the computing system of FIG. 4, which can include multiple physical computers. In some embodiments, the HTTPS install package request is sent to an alternate computing system rather than controller 252. The alternate compute system is coupled to the computing system that is executing controller 252. In these embodiments, the alternate computing system, rather than controller 252, can perform some or all of the operations and/or receives/sends some or all of the communications shown in FIG. 2 as being performed/sent/received by controller 252.

The HTTPS request uses secure socket layer/transport layer security (SSL/TLS) to ensure that communications between node 254 and controller 252 are secure, for example protecting against a "man in the middle" attack. Usage of HTTPS ensures that the messages/data sent between node 254 and controller 252 are encrypted. At this point node 254 trusts controller 252, as the operator obtained the HTTPS address from a trusted source. However, controller 252 does not yet trust node 254, as the HTTPS request of message 201 could come from any computer.

The following is an example of a portion of a script that includes a command that sends message 201:

sudo yum install—y https://platform.swiftstack.com/
       yum_repo/platform-repo-1.0-2.el6.noarchspm sudo
       yum makecache && sudo yum install—
       disableexcludes=all y swiftstack-node Controller 252 replies and sends a software package (such as platform-repo-1.0-2.el6.noarch.rpm in the example above) for installation by node 254 (message 203). As node 254 installs the package, the package sets up cryptographic trust on node 254 for data hosted by controller 252. Node 254 downloads and installs a node agent software package (such as swiftstack-node in the example above) from controller 252. Node 254 then starts a node agent process by executing the node agent software (block 258). The node agent registers with controller 252 securely via HTTPS (message 205). The registration can also include node 254 generating a digital fingerprint (block 260) and sending the digital fingerprint to controller 252 (message 205).

In some embodiments, the digital fingerprint is generated based on the physical hardware of node 254, and is a digital code that enables controller 252 to reliably and/or securely identify node 254. A digital fingerprint can be a unique identifier for a first computing system, such as node 254, and can enable a second computing system, such as controller 252, to be able to uniquely identify the first computing system. In some embodiments, the registration includes certificate validation, which can include validating a digital certificate against the certificate's signing authority by verifying the signature on the certificate with the signing authority's public key.

At block 256, controller 252 generates an identifier for node 254 and a secret key for node 254 (block 256). The identifier can be a node identifier, such as a universally unique identifier (UUID). The secret key can be a security key, which can have a value that is determined by encrypting a first digital value using an encryption key. In some embodiments, the UUID and/or the secret key are generated based on the digital fingerprint of message 205, such as by using the digital fingerprint as an encryption key to generate the UUID and/or the secret key. In some embodiments, the identifier of block 256 is a unique identifier. At block 256, controller 252 further creates a database entry for node 254 and stores a node record (e.g. the identifier and the secret key). The node record is anonymous, meaning that node 254 is not linked to any cluster or user of the storage system, as controller 252 has not yet established trust of node 254. Controller 252 sends the identifier and the secret key to node 254 (message 207).

Figure 3A:
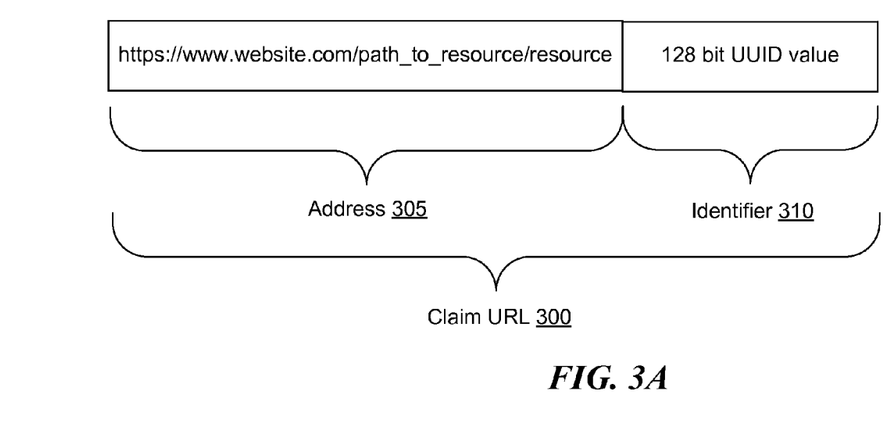
FIGS. 3A and 3B are illustrations of, respectively, an example of a claim uniform resource locator (URL), and an example of a certificate URL, consistent with various embodiments.

The node agent at node 254 receives the identifier and secret key, and uses them to generate a claim uniform resource locator (URL), such as claim URL 300 of FIG. 3A (block 262). Claim URL 300 of the example of FIG. 3A includes: address field, address 305, which is a URL for a resource at controller 252; and an identifier field, identifier 310, which in this example is a UUID with a 128 bit value. A URL, such as the URL of the address field, is a reference to a resource that specifies the location of the resource on a computer network and a mechanism for retrieving it. In some embodiments, some or all of the fields of the claim URL are encrypted prior to transmission via HTTPS. The identifier field is a field of the claim URL, and can contain any value that can be used to identify node 254, such as a UUID for node 254. In some embodiments, the identifier field uniquely identifies node 254. The claim URL is stored at node 254, and is communicated to user 250 (block 264), such as by node 254 displaying the claim URL to user 250, by emailing the claim URL to user 250, by texting the claim URL to user 250, etc.

Figure 3B:
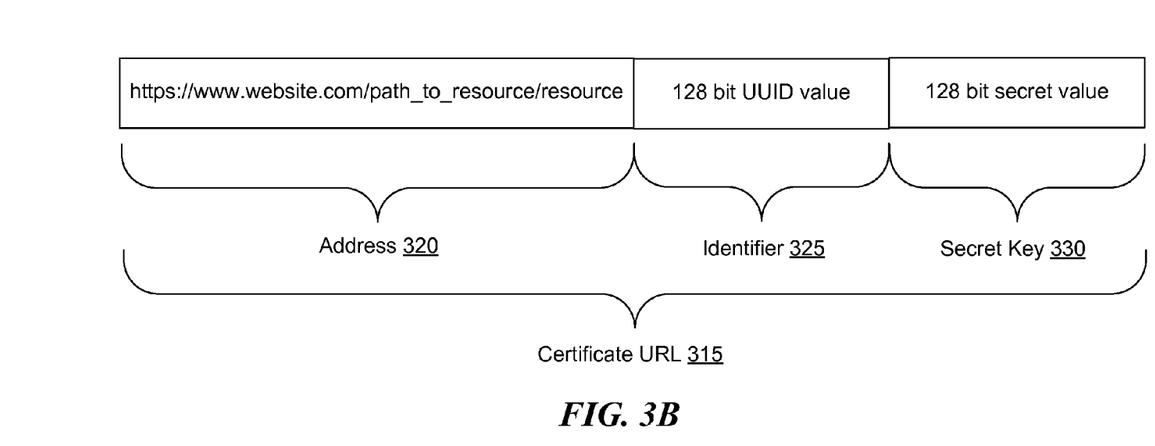

The node agent at node 254 also generates a certificate uniform resource locator (URL), such as the certificate URL 315 of FIG. 3B, based on the identifier and the secret key (block 263). Certificate URL 315 includes: address field, address 320, which is a URL for a resource at controller 252; an identifier field, identifier 325, which in this example is a UUID with a 128 bit value, and a secret key field, secret key 330, which in this example is another 128 bit value. In some embodiments, some or all of the fields of the certificate URL are encrypted prior to transmission via HTTPS. The identifier field is a field of the certificate URL, and can contain any value that can be used to identify node 254, such as a UUID for node 254. In some embodiments, the identifier field uniquely identifies node 254. The secret field is a field of the certificate URL and can contain any value that can be used to verify that the entity requesting the certificate bundle is node 254 and not an attacker who only has the node UUID.

The certificate URL can be stored at node 254, and is used by node 254 to generate messages 209, 213, and 219, which are all HTTPS GET requests.

The node agent of node 254 initiates a GET request using the certificate URL (message 209). If user 250 has not accessed the claim URL yet, such as by sending message 221, the GET request receives a 404 Not Found response (message 211). Node 254 keeps looping and requesting the certificate URL from controller 252 (messages 213, 217), and controller 252 keeps responding with a 404 Not Found error message (message 215) until controller 252 establishes trust of node 254, such as by user 250 sending message 221. After controller 252 establishes trust of node 254, the GET request of message 217 receives a certificate bundle in response (message 219). The certificate URL can indicate, for example, that the node agent is requesting a virtual private network (VPN) certificate bundle via HTTPS. When controller 252 receives a GET request using the certificate URL before controller 252 establishes trust of node 254, such as when controller 252 receives messages 209 and 213, controller 252 sends a message in response to the GET certificate request that indicates that controller 252 could not find a resource associated with the certificate URL (e.g., messages 211 and 215). Controller 252 can establish trust of node 254 by, for example, verifying that node 254 is an authentic node of Company X.

As discussed above, controller 252 continues responding with a 404 Not Found error message until controller 252 validates the authenticity of node 254. In some embodiments, the user validates the authenticity of node 254 by going to a sign-in URL of controller 252, signing in via an authenticated account, and accessing the claim URL (message 221). As a first example, the user, after signing in, can provide the value of the identifier to controller 252, and controller 252 can locate the node database record using the identifier, thereby establishing the ownership of node 254 by user 250. As a second example, the user can open a web browser and, using his credentials, log into controller 252. The user can copy and paste, or just type, the claim URL into the browser to provide the value of the identifier to controller 252.

Because the node UUID is known to the legitimate owner of node 254 and the owner can control who has access to the node UUID, verification that an authenticated user knows the claim URL of node 254 establishes that node 254 is owned by user 250. After the validation, controller 252 can now safely link node 254 with the account of the authorized user (block 266), and with the employer of the authorized user (in this example, Company X). Controller 252 can further generate a certificate bundle for node 254, which can include a configuration file, a private client certificate and key, and controller 252's public VPN certificate (block 268). The generation of the certificate bundle can be based on the identifier, for example, the UUID.

Once controller 252 establishes trust of node 254, and controller 252 receives an HTTPS GET request that includes the certificate URL from node 254 (message 217), controller 252 returns the certificate bundle via HTTPS (block 219). The node agent at node 254 receives the certificate bundle, which is trusted because the bundle came over HTTPS from a trusted server, and installs the certificate bundle. Once the certificate bundle is installed, the node agent at node 254 starts a secure communication agent, such as VPN (block 270). The secure communication agent establishes a secure connection between node 254 and controller 252, such as a VPN connection (block 272). In some embodiments where the secure connection is VPN, node 254's VPN connection verifies controller 252's certificate, and controller 252's VPN verifies node 254's certificate, resulting in a secure VPN tunnel between node 254 and controller 252. This VPN tunnel provides a secure communication channel between controller 252 and node 254. A secure connection between controller 252 and node 254, such as the VPN tunnel, enables controller 252 to sit in the cloud (e.g., on the Internet side of a firewall) while the data sits securely on the protected side of the firewall and behind other network security measures in a company's datacenter.

In some embodiments, all network communications are initiated by node 254. The VPN tunnel includes a firewall that rejects all requests made to node 254 other than those from the computer on the other side of the VPN tunnel (e.g., controller 252). This reduces the security threats that node 254 may encounter as it communicates over a less secure network with controller 252.

Figure 4:
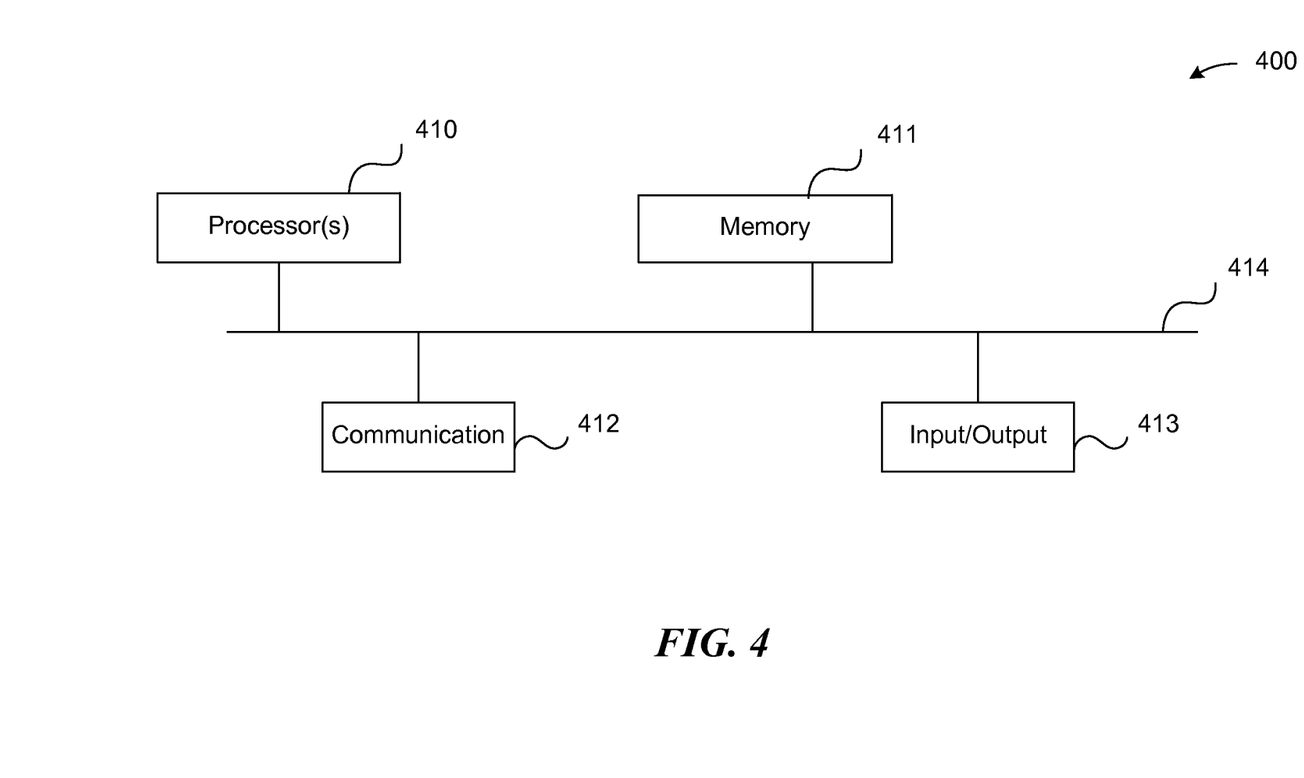
FIG. 4 is a block diagram illustrating an example of a processing system in which at least some operations described herein can be implemented, consistent with various embodiments.

FIG. 4 is a block diagram illustrating an example of a processing system in which at least some operations described herein can be implemented, consistent with various embodiments. Processing device 400 can represent any of the devices described above, e.g., the controller, the client user, the cluster operator, the dedicated load balancer, the nodes of a distributed storage cluster, etc. Any of these systems can include two or more processing devices, as is represented in FIG. 4, which can be coupled to each other via a network or multiple networks.

In the illustrated embodiment, the processing system 400 includes one or more processors 410, memory 411, a communication device 412, and one or more input/output (I/O) devices 413, all coupled to each other through an interconnect 414. The interconnect 414 may be or include one or more conductive traces, buses, point-to-point connections, controllers, adapters and/or other conventional connection devices. The processor(s) 410 may be or include, for example, one or more general-purpose programmable microprocessors, microcontrollers, application specific integrated circuits (ASICs), programmable gate arrays, or the like, or any combination of such devices. The processor(s) 410 control the overall operation of the processing device 400. Memory 411 may be or include one or more physical storage devices, which may be in the form of random access memory (RAM), read-only memory (ROM) (which may be erasable and programmable), flash memory, miniature hard disk drive, or other suitable type of storage device, or any combination of such devices. Memory 411 may store data and instructions that configure the processor(s) 410 to execute operations in accordance with the techniques described above. The communication device 412 may be or include, for example, an Ethernet adapter, cable modem, Wi-Fi adapter, cellular transceiver, Bluetooth transceiver, or the like, or any combination thereof. Depending on the specific nature and purpose of the processing device 400, the I/O devices 413 can include various devices, e.g., a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or any combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. Note that any and all of the embodiments described above can be combined with each other, except to the extent that it may be stated otherwise above or to the extent that any such embodiments might be mutually exclusive in function and/or structure.

Although the disclosed technique has been described with reference to specific exemplary embodiments, it will be recognized that the technique is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
   receiving a request, by a server and from an unverified storage node computer, for software to enable the unverified storage node computer to generate a first unique identifier to facilitate the server being able to uniquely identify the unverified storage node computer;
   in response to the request for the software, sending, by the server, client node software to the unverified storage node computer for installation at the unverified storage node computer, wherein the client node software enables the unverified storage node computer to generate signature data, the signature data being a unique identifier;
   receiving, by the server, first signature data after the unverified storage node computer generates the first signature data via the client node software;
   in response to said receiving of the first signature data, generating a security key and a second unique identifier to:
      enable the unverified storage node computer to generate a claim uniform resource locator (URL), wherein the claim URL enables the server to establish trust of the unverified storage node computer, and enables a user to securely claim a storage node; and
      enable the unverified storage node computer to generate a certificate URL, wherein the certificate URL enables the server to send a certificate bundle to the unverified storage node computer;

sending, by the server, the security key and the second unique identifier to the unverified storage node computer;

receiving the claim URL, by the server and from a user computer, after the claim URL was generated based on the security key and the second unique identifier, wherein said receiving of the claim URL enables the server to establish trust of the unverified storage node computer;

when the certificate URL is received from a first computer prior to the server establishing trust of the unverified storage node computer, sending, by the server and to the first computer, a message that indicates that the server could not find data associated with the certificate URL;

receiving, by the server and from a user computer, a login request of the user;

in response to the login request, facilitating a login of the user at the server;

based on the login of the user at the server and said receiving of the claim URL, linking the user and the unverified storage node computer via a database thereby indicating that the server established trust of the unverified storage node computer; and when the certificate URL is received after the server establishes trust of the unverified storage node computer, facilitating the claiming of the storage node by the user.

2. The method of claim 1,
wherein the facilitating of the claiming of the storage node by the user includes sending a digital certificate to the unverified storage node computer to enable a virtual private network (VPN) to be securely established between the unverified storage node computer and the server.

3. The method of claim 2, further comprising:
establishing a VPN between the unverified storage node computer and the server based on the digital certificate to enable data of the storage node to be protected by a firewall that prevents unauthorized access to the unverified storage node computer, and to enable the unverified storage node computer and the server to securely communicate,
wherein messages from the Internet to the unverified storage node computer are filtered by the firewall to prevent unauthorized access to the unverified storage node computer, and
wherein messages from the Internet to the server do not pass through the firewall and are not filtered by the server.

4. The method of claim 1, wherein the unverified storage node computer, the user computer, and the first computer are all a same computer.

5. A method comprising:
receiving, by a server and from a computer, a claim uniform resource locator (URL) that was generated based on a first digital security key and first digital identity data,
wherein the claim URL indicates a request by a user to access a storage node associated with a storage node computer, and
wherein values of the first digital security key and the first digital identity data are both stored at locations accessible to the server;
verifying, by the server, that the claim URL is associated with the user based on the values of the first digital security key and the first digital identity data;

receiving, by the server and from the computer, a certificate URL that was generated based on a second digital security key and second digital identity data;
sending, by the server and to the computer, a message that indicates that the server could not find data associated with the certificate URL when said receiving of the certificate URL occurs before said verification that the claim URL is associated with the user; and
facilitating, by the server, said request to access the storage node when said receiving of the certificate URL occurs after said verification that the claim URL is associated with the user.

6. The method of claim 5, wherein said verifying that the claim URL is associated with the user includes verifying that the claim URL was generated based on the first digital security key and the first digital identity data.

7. The method of claim 6,
wherein said verifying that the claim URL was generated based on the first digital security key includes verifying that the claim URL includes data that was generated based on an encryption of the first digital security key, and
wherein the computer and the storage node computer are a same computer.

8. The method of claim 6,
wherein said verifying that the claim URL was generated based on the first digital identity data includes verifying that the claim URL includes data that was generated based on a universally unique identifier (UUID) of the storage node computer, and
wherein the first digital identity data is the UUID of the storage node computer.

9. The method of claim 5, wherein said verifying that the claim URL is associated with the user includes verifying that the claim URL was sent from a user account while the user was logged into the user account.

10. The method of claim 5,
wherein said facilitating said request to access the storage node includes the server:
based on said verifying that the claim URL is associated with the user, linking an account of the user and any of the storage node or the storage node computer via a database to enable the user to access the storage node.

11. The method of claim 5,
wherein said facilitating said request to access the storage node includes the server:
sending a digital certificate to the storage node computer to enable the storage node computer to initiate a virtual private network (VPN) with the server, and
in response to receiving a request to establish a VPN from the storage node computer, establishing a VPN with the storage node computer based on the digital certificate to enable data of the storage node to be protected by a firewall that prevents unauthorized access to the storage node computer,
wherein messages transmitted via the Internet to the storage node computer are filtered by the firewall to prevent unauthorized access to the storage node computer, and
wherein messages transmitted via the Internet to the server are not filtered by and do not pass through the firewall.

12. The method of claim 11,
wherein the server is a cloud server and the storage node is cloud storage, and wherein the server is accessible from the Internet and the storage node is protected by the firewall from unauthorized messages transmitted via the Internet.

13. The method of claim 5,
wherein said facilitating said request to access the storage node includes the server:
allocating the storage node to an account of the user, and
enabling the account of the user to be able to execute commands that write data to and read data from the storage node.

14. The method of claim 5,
wherein the certificate URL indicates a request for a certificate bundle, and
wherein said facilitating said request to access the storage node includes the server:
generating the certificate bundle for the storage node computer,
wherein the certificate bundle includes a configuration file, a private client certificate and key, and a VPN certificate of the server, and
sending the certificate bundle to the storage node computer to enable the storage node computer to initiate a VPN with the server.

15. The method of claim 5, wherein the message that indicates that the server could not find data associated with the claim URL is a hypertext transfer protocol (HTTP) 404 Not Found error message.

16. The method of claim 5, wherein said claim URL that was received by the server was received via a secure HTTP protocol (HTTPS).

17. The method of claim 5, further comprising:
receiving a request, by the server and from the storage node computer, for software to enable the storage node computer to generate, based on physical hardware of the storage node computer, a digital fingerprint that enables the server to identify the storage node computer;
in response to the request for the software, sending the software by the server;
receiving, by the server, the digital fingerprint from the storage node computer after the storage node computer generates the digital fingerprint by use of the software;
in response to said receiving of the digital fingerprint, generating the first digital security key and the first digital identity data by the server; and
sending, by the server, the first digital security key and the first digital identity data to the storage node computer.

18. The method of claim 17,
wherein the request for the software is based on a URL that was obtained from a supplier of the software, and
wherein the request for the software includes the URL and was received via the HTTPS protocol.

19. The method of claim 17, wherein execution of the software by a selected computer initiates a node agent that enables the selected computer to securely register with the server via HTTPS, and that enables the selected computer to verify a security certificate of the server, the method further comprising:
receiving, by the server and from the storage node computer, a message sent by the node agent via HTTPS after the storage node computer executes the software and verifies the security certificate of the server, wherein the storage node computer is the selected computer; and
registering the storage node computer, by the server, based on the digital fingerprint.

20. The method of claim 5, wherein the first digital security key and the second digital security key are a same digital security key, and wherein the first digital identity data and the second digital identity data are a same digital identity data.

21. A computing system comprising:
a processor;
a networking interface coupled to the processor; and
a memory coupled to the processor and storing instructions which, when executed by the processor, cause the computing system to perform operations including:
receiving, via the networking interface, from a computer, a claim uniform resource locator (URL) that was generated based on a first digital security key and first digital identity data,
wherein the claim URL indicates a request by a user to access a storage node associated with a storage node computer, and
wherein values of the first digital security key and the first digital identity data are both stored at locations accessible to the computing system;
verifying that the claim URL is associated with the user based on the values of the first digital security key and the first digital identity data;
receiving, from the computer, a certificate URL that was generated based on a second digital security key and second digital identity data;
sending, to the computer, a message that indicates that the computing system could not find data associated with the certificate URL when said receiving of the certificate URL occurs before said verification that the claim URL is associated with the user; and
facilitating said request to access the storage node when said receiving of the certificate URL occurs after said verification that the claim URL is associated with the user.

* * * * *